United States Patent [19]

Fukuda et al.

[11] Patent Number: 4,988,758

[45] Date of Patent: Jan. 29, 1991

[54] FLUOROSILICONE RUBBER COMPOSITION

[75] Inventors: Takeshi Fukuda; Motoo Fukushima; Kunio Itoh; Hironao Fujiki, all of Gunma, Japan

[73] Assignee: Shin-Etsu Chemical Co., Ltd., Tokyo, Japan

[21] Appl. No.: 222,212

[22] Filed: Jul. 21, 1988

Related U.S. Application Data

[63] Continuation-in-part of Ser. No. 157,124, Feb. 10, 1988, abandoned, and a continuation of Ser. No. 3,946, Nov. 16, 1987, abandoned.

[30] Foreign Application Priority Data

Jan. 20, 1986 [JP] Japan .................................. 61-9652

[51] Int. Cl.$^5$ ........................... C08L 83/07; C08K 3/36
[52] U.S. Cl. ...................... 524/492; 524/588; 524/866; 528/15; 528/24
[58] Field of Search .................. 528/24, 15; 524/588, 524/866, 492

[56] References Cited

U.S. PATENT DOCUMENTS

| | | | |
|---|---|---|---|
| 3,050,492 | 8/1962 | Polmanteer et al. | 524/588 |
| 3,629,297 | 12/1971 | Antonen | 524/866 |
| 4,525,528 | 6/1985 | Bush et al. | 528/24 |
| 4,529,792 | 7/1985 | Bluestein | 524/588 |
| 4,585,848 | 4/1986 | Evans et al. | 528/15 |
| 4,654,408 | 3/1987 | Okinoshima | 528/15 |
| 4,742,101 | 5/1988 | Yoshida | 528/24 |

OTHER PUBLICATIONS

Noll; Chemistry and Technology of Silicones; Academic Press; 1968; pp. 400, 401.

Primary Examiner—Lewis T. Jacobs
Attorney, Agent, or Firm—Wyatt, Gerber, Burke & Badie

[57] ABSTRACT

The fluorine-substituted organopolysiloxane as the principal ingredient of the inventive silicone rubber composition has vinyl groups to serve as the cross-linking points at the molecular chain terminals while at least the penultimate siloxane unit or the silicon atom adjacent to the terminal silicon atom has no fluorine-substituted hydrocarbon group bonded to the silicon atom. Being freed from the steric hindrance due to the bulky fluorine-substituted hydrocarbon group bonded to the adjacent silicon atom, the vinyl group bonded to the terminal silicon atom can pertain to the cross-linking reaction much easier than otherwise so that the silicone rubber composition of the invention containing an organic peroxide or a combination of an organohydrogenpolysiloxane and a platinum catalyst as a curing agent can be rapidly cured to give a cured silicone rubber article having excellent resistance against oils and organic solvents as well as mechanical properties.

8 Claims, 2 Drawing Sheets

FLUOROSILICONE RUBBER COMPOSITION

BACKGROUND OF THE INVENTION

This is a continuation-in-part application from a copending U.S. patent application Ser. No. 07/157,124 filed Feb. 10, 1988, now abandoned, which is a continuation application of a now abandoned U.S. patent application Ser. No. 07/003,946 filed Jan. 16, 1987.

The present invention relates to a curable fluorosilicone composition or, more particularly, to a fluorosilicone composition having good curability and useful as a molding compound for injection molding, gel-like potting material or adhesive or capable of giving a cured silicone rubber having excellent resistance against oils and organic solvents, restorability from compression and mechanical strengths so as to be useful as a material for shaping diaphragms and oil seals as a part of, for example, equipments for transportation.

As is well known, fluorosilicone rubbers or, namely, silicone rubbers of which the organopolysiloxane molecules have siliconbonded hydrocarbon groups at least partly substituted by fluorine atoms for the hydrogen atoms, such as 3,3,3-trifluoropropyl group, have excellent characteristics such as heat resistance, cold resistance, resistance against oils and solvents, restorability from compression and so on in comparison with other conventional nonfluorine silicone rubbers so that they are widely used as a material for shaping various parts of transportation equipments such as automobiles and aircrafts and various parts of machines used in petroleum industry. See, for example, U.S. Pat. Nos. 2,979,519 and 3,179,610 teaching a silicone rubber composition of which the organopolysiloxane molecules have perfluorinated hydrocarbon groups and which are capable of giving cured silicone rubbers having excellent resistance against hydrocarbon solvents. These prior art fluorosilicone rubber compositions are, however, defective in respect of the low curability that the composition cannot be cured at a relatively low temperature such as room temperature and in respect of the poor mechanical properties of the rubber products obtained by curing the composition even when the composition has been fully cured.

It is usual that organopolysiloxane gums as a principal ingredient of a silicone rubber composition are prepared by the ring opening polymerization of a cyclic diorganosiloxane oligomer using an alkali catalyst in the presence of a chain terminal-forming agent such as a hexaorganodisiloxane. It is sometimes desirable to use 1,1,3,3-tetramethyl-1,3-divinyl disiloxane as teh chain terminal-forming agent so that a vinyl gruop is introduced into each terminal of the diorganopolysiloxane molecules to serve as a crosslinking point. When a fluorine-substituted cyclic diorganosiloxane oligomer is subjected to the ring-opening polymerization in the above described manner using an alkali catalyst in the presence of 1,1,3,3-tetramethyl-1,3-divinyl disiloxane, however, the vinyl groups can hardly be introduced into the molecular chain terminals due to the very specific polymerization characteristics of the cyclic oligomer. Therefore, vinyl groups to serve as the crosslinking points are usually introduced into the molecules of the fluorine-substituted organopolysiloxane gum by the copolymerization of 1,3,5-trimethyl-1,3,5-trivinyl cyclotrisiloxane and 1,3,5-trimethyl-1,3,5-tris(3,3,3-trifluoropropyl) cyclotrisiloxane.

A problem in the thus prepared fluorine-substituted organopolysiloxane gum as the principal ingredient of a fluorosilicone rubber composition is the relatively low velocity of the crosslink-forming reaction of the vinyl groups with the free radicals produced from an organic peroxide or of the vinyl groups by the hydrosilation reaction with silicon-bonded hydrogen atoms in an organohydrogenpolysiloxane admixed as a crosslinking agent in the presence of a platinum catalyst presumably due to the three-dimensional bulkiness of the trifluoropropyl groups. Another problem in the conventional fluorosilicone rubbers is the relatively low mechanical strengths thereof in comparison with ordinary organic rubbers including fluorocarbon rubbers.

The reason for the above mentioned defects in the conventional fluorosilicone rubbers is presumably that when the fluorinated alkyl groups having bulkiness are present in the vicinity of the silicon-bonded vinyl groups, which should provide the crosslinking points, the vinyl groups can pertain to the crosslinking reaction with the free radicals produced from an organic peroxide admixed as a curing agent or silicon-bonded hydrogen atoms with which the vinyl groups enter the hydrosilation reaction to form crosslinks only with a greatly decreased velocity of the crosslinking reaction consequently not to impart the cured silicone rubber composition with full mechanical strengths.

Several attempts and proposals have of course been made in the prior art to solve the above mentioned problem. For example, U.S. Pat. Nos. 4,032,502 and 4,029,629 teach that the curing velocity of a fluorosilicone rubber composition can be controlled by using an organohydrogenpolysiloxane of which the silicon-bonded hydrogen atoms are introduced into the polysiloxane molecules in the form of a monofunctional siloxane units of the formula $HR_2SiO_{\frac{1}{2}}$, R being a monovalent hydrocarbon group. Needless to say, the applicability of this method is limited to the compositions curable by the mechanism of hydrosilation and no solution of the problem is provided for the fluorosilicone rubber compositions of the type curable with an organic peroxide as a curing agent.

SUMMARY OF THE INVENTION

Thus, the curable fluorine-substituted organopolysiloxane composition of the present invention, developed to overcome the above described problems and disadvantages in the prior art compositions, comprises, in admixture:

(A) a polydiorganosiloxane having a viscosity of at least 400 centipoise at 25° C. and a molecular structure represented by the general formula

(I)

or

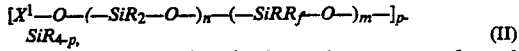

(II)

in which R is a monovalent hydrocarbon group selected from the class consisting of methyl, vinyl and phenyl groups, $R_f$ is a fluorinated alkyl group having 3 to 10 carbon atoms, n is zero or a positive integer, m is a positive integer with the proviso that m:(m+n) is in the range from 0.005 to 1, p is 2, 3 or 4, $X^1$ is a vinyl dimethyl siloxy-substituted silyl group represented by the general formula

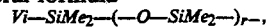

in which Vi is a vinyl group, Me is a methyl group and r is a positive integer in the range from 1 to 30, and $X^2$ is H or $X^1$;

(B) a curing agent in an amount sufficient to effect curing of the component (A); and (C) optionally, a finely divided silica filler having a specific surface area of at least 50 $m^2/g$.

In particular, the curing agent as the component (B) is (B-1) an organic peroxide in an amount in the range from 0.1 to 10 parts by weight per 100 parts by weight of the component (A) or (B-2) a combination of (B-2a) a platinum compound in an amount in the range from 0.1 to 200 ppm by weight as platinum based on the component (A) and (B-2b) an organohydrogenpolysiloxane having at least three hydrogen atoms directly bonded to the silicon atoms in a molecule in an amount sufficient to provide from 0.5 to 4.0 moles of the silicon-bonded hydrogen atoms per mole of the vinyl groups in the component (A).

When the composition is admixed with the silica filler as the component (C), the amount of the silica filler should be 100 parts by weight or smaller per 100 parts by weight of the component (A).

BRIEF DESCRIPTION OF THE DRAWING

The figures graphically illustrate the curing characteristics of the fluorosilicone rubber compositions prepared in the examples and comparative examples, of which

DETAILED DESCRIPTION OF THE PREFERRED EMBODIMENTS

Figure 1:
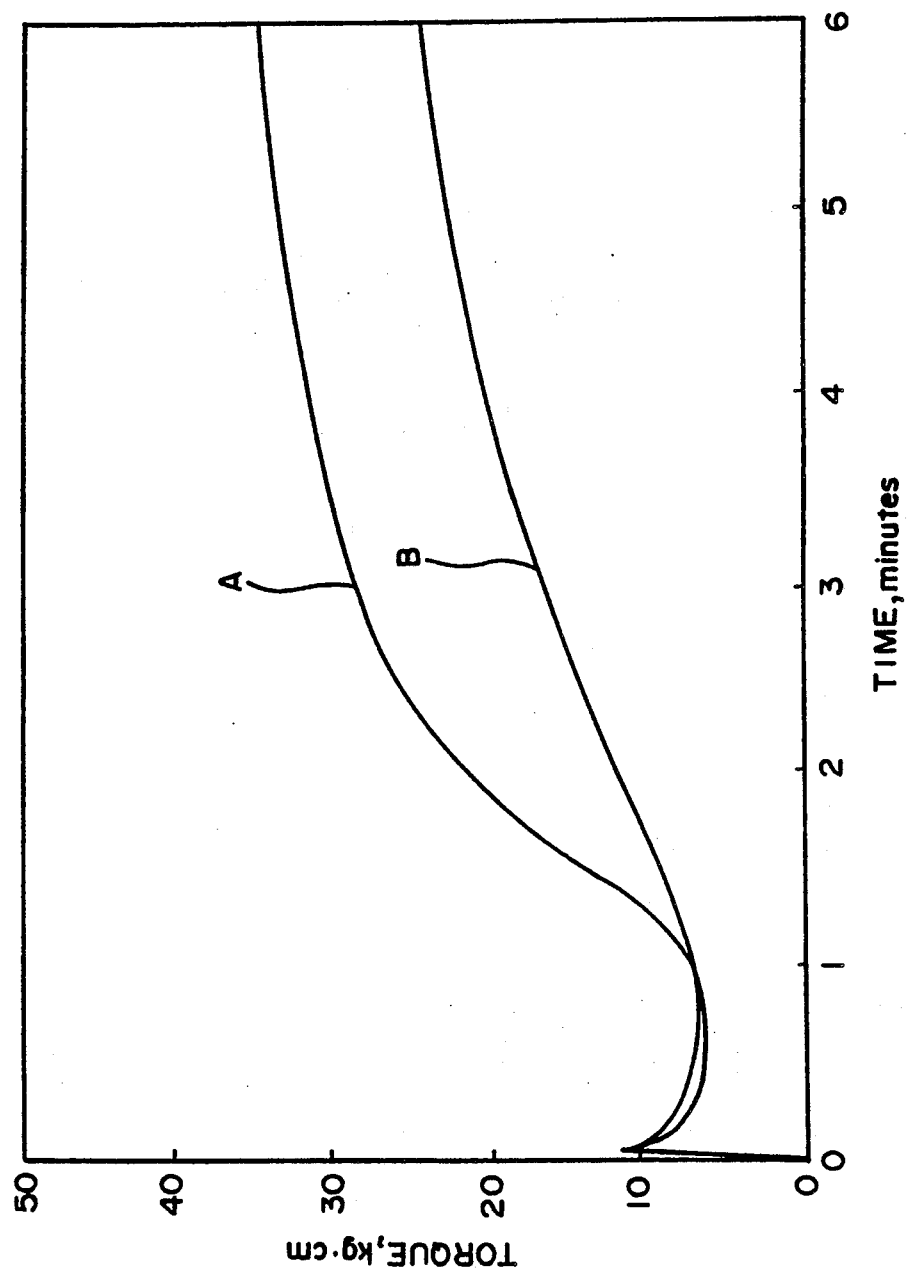
FIG. 1 is for Examples 1 and Comparative Example 1 and FIG. 2 is a for Example 2 and Comparative Examples 2 to 4.

As is understood from the above given summary of the invention, the most characteristic feature of the inventive fluorosilicone rubber composition consists in the specific molecular structure of the fluorine-substituted linear or branched-chain polydiorganosiloxane as the component (A), in which one of the molecular chain terminals is blocked with a vinyl-containing end group or, in particular, with a dimethyl (vinyl dimethyl siloxy) silyl group of the formula $ViMe_2Si-O-SiMe_2-$. While the vinyl group at the molecular chain end serves as a crosslinking point, the reactivity thereof for the crosslink formation is not affected by the fluorine-containing groups because the vinyl-containing terminal group is necessarily separated form the siloxane units having fluorine-substituted groups with at least one dimethylsiloxane unit intervening therebetween so that the curing characteristic of the composition is greatly improved in comparison with conventional fluorosilicone rubber compositions.

The component (A) in the inventive fluorosilicone rubber composition is a fluorine-substituted polydiorganosiloxane represented by the general formula (I) or (II) given above. In the formula (I), one of the molecular chain ends may be blocked with a silanolic hydroxy group while the other molecular chain end is necessarily blocked with the group denoted by $X^1$ which is represented by the general formula $Vi-SiMe_2-(-O-SiMe_2-)_r-$, in which Vi is a vinyl group, Me is a methyl group and the subscript r is a positive integer in the range from 1 to 30. It is of course optional that two different polydiorganosiloxanes represented by the general formulas (I) and (II), respectively, are used in combination.

The group denoted by R in the general formulas (I) and (II) is a methyl, vinyl or phenyl group while the group denoted by $R_f$ is a fluorinated alkyl group. Examples of the group denoted by $R_f$ include 3,3,3-trifluoropropyl, 2-(perfluorobutyl)ethyl and 2-perfluooctyl)ethyl groups.

The subscript n in the general formulas (I) and (II) is zero or a positive integer and the subscript m is a positive integer. The values of these subscripts are not particularly limitative provided that the organopolysiloxane has a viscosity of at least 400 centipoise at 25° C. The value of m:(m+n) should preferably be in the range from 0.005 to 1 so that the organopolysiloxane contains the fluorinated group-containing siloxane units at least in a substantial molar proportion.

The fluorine-substituted polydiorganosiloxane represented by the general formula (I) can be prepared, for example, by the following method. Thus, (i) 1 mole of vinyl dimethyl silanol of the formula $ViMe_2SiOH$ is reacted with 1 to 10 moles of metallic lithium at a temperature in the range from −10 to +50° C. for a length of time of 0.5 to 24 hours to give vinyl dimethyl siloxy lithium of the formula $ViMe_2SiOLi$, in which Me and Vi are methyl and vinyl groups, respectively, and then (ii) 1 mole of this siloxy lithium compound is reacted with 0.333 to 10 moles or, preferably, 1 to 10 moles of hexamethyl cyclotrisiloxane of the formula $(Me_2SiO)_3$ at a temperature in the range from −10° C. to +50° C. for a length of time of 0.5 to 24 hours to give a lithium-terminated organosiloxane oligomer of the formula

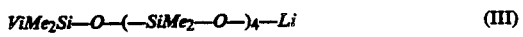

$$ViMe_2Si-O-(-SiMe_2-O-)_4-Li \quad (III)$$

in which r is a positive integer of 1 to 30 Thereafter, (iii) a ring opening polymerization reaction of 5 to 50 moles of 1,3,5-trimethyl-1,3,5-tris(3,3,3-trifluoropropyl) cyclotrisiloxane of the formula $[Si(CH_3)(CH_2CH_2CF_3)-O]_3$ is performed in the presence of 0.01 mole of the above obtained organosiloxane oligomer of the formula (III) as a polymerization catalyst at a temperature in the range from 50° C. to 180° C. for a length of time of 0.5 to 24 hours to give a lithium-terminated polydiorganosiloxane of the formula

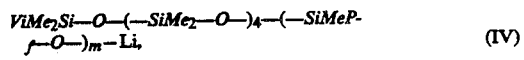

$$ViMe_2Si-O-(-SiMe_2-O-)_4-(-SiMeP_f-O-)_m-Li \quad (IV)$$

in which Me is a methyl group, $P_f$ is a 3,3,3trifluoropropyl group an m and r each have the same meaning as defined above, followed by (iv) inactivation of the lithium-blocked terminal by the neutralization treatment with a mixture of a chlorosilane and an organosiloxane and/or a weak acid into the polydiorganosiloxane of the general formula (I) above.

The first and the second steps of the above described process, i.e. the reaction of metallic lithium with vinyl dimethyl silanol and oligomerization of the hexamethyl cyclotrisiloxane, should preferably be performed in a reaction medium of a polar organic solvent such as tetrahydrofuran with an object to enhance the reactivity of the solid lithium with the silanol compound and to increase the solubility of the siloxy lithium compound as well as to facilitate removal of the unreacted metallic lithium by filtration. Although the reaction mixture obtained in the above mentioned first step (i) and freed from the unreacted metallic lithium can be used as such in the subsequent step of the oligomerization of hexamethyl cyclotrisiloxane, it is preferable that the reaction mixture obtained in the second step (ii) is freed from the organic solvent as completely as possible before it is used in the third step of the ring-opening polymerization of 1,3,5-trimethyl-1,3,5-tris(3,3,3-trifluoropropyl) cyclotrisiloxane since the polar organic solvent such as tetrahydrofuran may promote re-equilibration reaction of the once formed polydiorganosiloxane.

The chlorosilane-organosiloxane mixture used in the above mentioned inactivation treatment of the lithium-terminated polydiorganosiloxane of the formula (IV) is preferably a mixture of 1 mole of a methyl chlorosilane of the formula $Me_aSiCl_{4-a}$, a being zero, 1,2 or 3, and 1 to 10 moles of hexamethyl disilazane of the formula $Me_3Si—NH—SiMe_3$ and the mixture is used in such an amount that from 1 to 50 moles of the silicon-bonded chlorine atoms are provided per mole of lithium in the siloxy lithium compound. The weak acid as the neutralizing agent may be acetic acid used in an amount also in the range from 1 to 50 moles per mole of lithium.

Although a part of the methyl groups in the general formula (I) may be replaced with other monovalent hydrocarbon groups, it is preferable that all of the organic groups bonded to the silicon atoms other than the terminal vinyl groups and the fluorinated groups $R_f$ are all methyl groups. In particular, the methyl groups bonded to the terminal and penultimate silicon atoms should not be replaced with other more bulky hydrocarbon groups in order not to cause steric hindrance to the terminal vinyl group in the crosslinking reaction by the attack of the free radicals produced from an organic peroxide added to the composition as the curing agent or of the silicon-bonded hydrogen atoms of an organohydrogenpolysiloxane atoms to effect the hydrosilation reaction.

The subscript r in the general formula giving the terminal group $X^1$ should be a positive integer not exceeding 30. When r is larger than 30, the velocity of the polymerization reaction int he third step (iii) described above would be greatly decreased because of the decrease in the solubility of the siloxane oligomer used as the catalyst in the 1,3,5-trimethyl-1,3,5-tris (3,3,3-trifluoropropyl) cyclotrisiloxane. Preferably, the subscript should be an integer of 3 to 12. The subscript p in the general formula (II) is 2, 3 or 4 without particular limitation.

An alternative method for the preparation of the organopolysiloxane represented by the general formula (I) as the component (A) is as follows. Thus, a trimetyl trifluoroalkyl cyclotrisiloxane or a tetramethyl tetra(-fluoroalkyl) cyclotetrasiloxane is admixed with hexamethyl cyclotrisiloxane or octamethyl cyclotetrasiloxane in a suitable proportion depending on the desired product together with a catalytic amount of a basic compound, e.g., potassium hydroxide, cesium hydroxide, tetramethyl phosphonium hydroxide and tetramethyl ammonium hydroxide as well as siliconates thereof, and water in an amount sufficient to serve as a chain-end stopper and the mixture is heated under agitation at a temperature of 80° C. to 200° C. or, preferably, 100° C. to 150° C. to give a hydroxy-terminated diorganopolysiloxane of the general formula

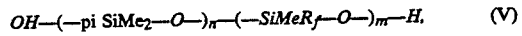
$$OH—(—pi\ SiMe_2—O—)_n—(—SiMeR_f—O—)_m—H. \quad (V)$$

in which each symbol has the same meaning as defined above.

Separately, vinyl dimethyl chlorosilane and hexamethyl cyclotrisiloxane are reacted at room temperature in the presence of a catalyst such as hexamethyl phosphoric triamide to give a vinyl and chlorine-terminated dimethylpolysiloxane of the formula

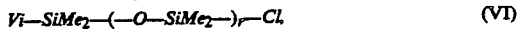
$$Vi—SiMe_2—(—O—SiMe_2—)_r—Cl \quad (VI)$$

in which each symbol has the same meaning as defined above. The value of r can be adequately controlled by suitably selecting the molar proportion of the vinyl dimethyl chlorosilane and hexamethyl cyclotrisiloxane.

In the next place, the hydroxy-terminated polysiloxane of the general formula (V) and the vinyl-and chlorine-terminated polysiloxane of the general formula (VI) are subjected to a dehydrochlorination reaction in the presence of a hydrogen chloride acceptor such as tertiary amines and organosiloxane compounds to give a vinyl-terminated polydiorganosiloxane of the formula

A still alternative method is as follows. Thus, a trimethyl tri(fluoroalkyl) cyclotrisiloxane such as 1,3,5-trimethyl-1,3,5-tris(3,3,3-trifluoropropyl) cyclotrisiloxane is dissolved in a polar organic solvent such as acetonitrile, tetrahydrofuran, ethyl acetate, dimethyl sulfoxide and the like and kept standing in the presence of a pentavalent coordination compound of silicon such as those disclosed in Japanese Patent Publication 45-1070 as a catalyst at a temperature of 0° C. to 50° C. or, preferably, 10° C. to 30° C. for 10 to 20 hours with further addition of a small amount of water to provide the hydroxy terminal groups so as to give a hydroxy-terminated diorganopolysiloxane of the general formula

$$HO—(—SiMeR_f—O—)_m—H. \quad (VIII)$$

This hydroxy-terminated diorganopolysiloxane is then subjected to a dehydrochlorination reaction with the vinyl-and chlorine-terminated organopolysiloxane of the general formula (VI) given above to give the desired polydiorganosiloxane of the general formula

Further, the vinyl-and chlorine-terminated organopolysiloxane of the general formula (VI) given above is added dropwise to a non-polar organic solvent such as toluene, xylene, n-hexane and the like in an amount of 5 to 10 times thereof containing sodium hydrogen carbonate dispersed therein in an amount of 1.5 to 2.0 times by moles of the chlorine contained int eh organopolysiloxane so that the chlorine atom at one of the molecular chain ends is converted into a hydroxy group to give a vinyl-and hydroxy-terminated polydiorganosiloxane. When the ring-opening polymerization reaction of a trimethyl tris(fluoroalkyl) cyclotrisiloxane in a polar organic solvent as catalyzed by a pentavalent coordination compound of silicon is performed in the presence of such a vinyl-and hydroxy-terminated polydiorganosiloxane, the resultant product is a desired polyorganosiloxane of the general formula

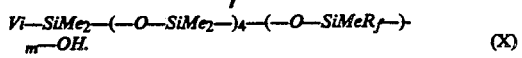
(X)

The above described vinyl-and hydroxy-terminated polydiorganosiloxane of the general formula (X) can be used as an intermediate for the preparation of the polyorganosiloxane represented by the general formula (II) as the component (A) by reacting the same with an organosiloxane compound represented by the general formula

 , (XI)

in which R and p each have the same meaning as defined before and Y is a chlorine atom or an amino group substituted with methyl, ethyl or propyl groups to give a polyorganosiloxane of the general formula

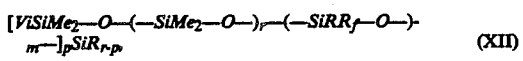 (XII)

in which each symbol has the same meaning as defined before.

A typical example of the fluorine-substituted polydiorganosiloxane having vinyl groups at both molecular chain ends as the component (A) expressed by the following structural formula:

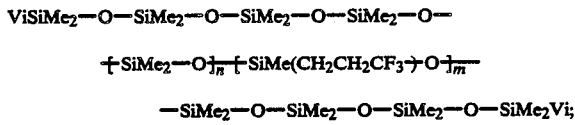

in which n and m are each a positive integer satisfying the relationship that n+m is in the range from 30 to 3000 and m:(m+n) is in the range from 0.005 to 1.00, the other symbols each having the same meaning as defined before.

The second essential ingredient in the inventive composition, i.e. component (B), is a curing agent of the above described component (A). Since the polyorganosiloxane as the component (A) has vinyl groups as the crosslinking points in the molecular structure, know methods of curing an organopolysiloxane of this type can be used also in this case, Namely, the polyorganosiloxane can be cured by compounding with an organic peroxide and heating the composition. Alternatively, the polyorganosiloxane can be cured by compounding with an organohydrogenpolysiloxane together with a catalytic amount of a platinum compound as a catalyst to effect the platinum-catalyzed addition reaction or so-called hydrosilation reaction between the silicon-bonded vinyl groups and the silicon-bonded hydrogen atoms, if necessary, by heating. Either of these two methods can provide a cured silicone rubber at a remarkably increased curing velocity and/or provide a cured silicone rubber article having greatly improved mechanical properties as compared with conventional fluorine-containing silicone rubber compositions.

Examples of organic peroxide suitable as a curing agent of the component (A) in the inventive composition include various kinds of conventionally used ones for curing of silicone rubber compositions such as diacyl peroxides, e.g., benzoyl peroxide and 2,4-dichlorobenzoyl peroxide, alkyl peroxides, e.g., di-tert-butyl peroxides and 2,5-dimethyl-2,5-di(tert-butyl peroxy) hexane, and alkaryl peroxides, e.g., dicumyl peroxide. The amount of the organic peroxide as the curing agent should be in the range from 0.1 to 10 parts by weight or, preferably, from 0.2 to 6 parts by weight per 100 parts by weight of the fluorine-substituted polydiorganosiloxane as the component (A) in order to fully cure the composition.

The composition of the invention compounded of the component (A) and an organic peroxide as the component (B) is heated at a temperature in the range from 100° to 200° C. or, preferably, from 120° to 180° C. in order to efficiently cure the composition. Oxygen in the atmospheric air may have some retarding influences on the curing velocity so that the curing reaction of the composition is performed preferably under a hermetically sealed condition or by compression molding to prepare a shaped silicone rubber article.

When curing of the component (A) is performed by the hydrosilation reaction, the curing agent is a combination of an organohydrogenpolysiloxane and a platinum catalyst. The platinum catalyst to be added to the inventive composition in combination with an organohydrogenpolysiloxane may be any of known ones including platinum black, chloroplatinic acid optionally modified with an alcohol, complexes of chloroplatinic acid with a vinyl-containing organopolysiloxane, olefin or aldehyde and the like. The amount of the platinum catalyst to be added to the inventive composition should be in the range from 0.1 to 200 ppm by weight as platinum based on the amount of the fluorine-substituted polyorganosiloxane as the component (A).

The organohydrogenpolysiloxane used as a crosslinking agent of the component (A) should have at least three silicon-bonded hydrogen atoms, i.e. hydrogen atoms directly bonded to the silicon atoms, in a molecule in order to effectively form crosslinks while the molecular configuration thereof is not particularly limitative including straightly linear, branched chain-like and cyclic ones. The amount of the organohydrogenpolysiloxane in the inventive fluorosilicone rubber composition should be sufficient to provide form 0.5 to 4.0 moles of the silicon-bonded hydrogen atoms per mole of the vinyl groups in the fluorine-substituted polyorganosiloxane as the component (A).

Examples of the organohydrogenpolysiloxane suitable as the crosslinking agent include those expressed by the following structural formulas:

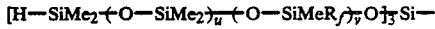

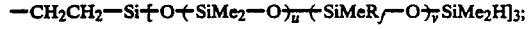

in which u is a positive integer and v and w are each zero or a positive integer, as well as organohydrogenpolysiloxanes having a resinous structure as composed of the monofunctional siloxane units of the formula $HSiMe_2O_{0.5}$ and tetrafunctional siloxane units of the formula $SiO_2$, in which the molar ratio of (H+Me)/Si is 1.0 to 2.7, and those composed of the monofunctional siloxane units of the formula $HSiMe_2O_{0.5}$, difunctional siloxane units of the formula $SiMe_2O$ and/or $SiMeR_fO$ and tetrafunctional siloxane units of the formula $SiO_2$, in which the molar ratio of (H+Me)/Si is 1.2 to 2.7.

The component (C), which is an optional ingredient compounded in the inventive composition according to need, is a finely divided siliceous filler which may be any of known ones conventionally used in silicone rubber compositions as a reinforcing filler including silica hydrogels and silica aerogels, e.g., fumed silica and precipitated silica. It is essential that the siliceous filler should have a specific surface area of at least 50 m$^2$/g as determined by the BET method is order that the filler may exhibit a full reinforcing effect. The amount of the finely divided siliceous filler as the component (C) in the inventive fluorosilicone rubber composition should be int eh range from 5 to 100 parts by weight per 100 parts by weight of the fluorine-substituted polydiorganosiloxane as the component (A). When the amount of the filler is too small, the reinforcing effect to be obtained with the filler would be insufficient so that the composition cannot give a cured silicone rubber article having high mechanical properties as desired. When the amount of the siliceous filler is too large, on the other hand, difficulties are encountered in the compounding work of the components and, even if a composition could be prepared somehow, the composition is too stiff and poorly moldable and the cured silicone rubber thereof also may have poor mechanical properties.

The fluorosilicone rubber composition of the present invention can be prepared by uniformly mixing the above described components (A), (B) and, optionally, (C) each in a calculated and weighed amount using a conventional mixing machine such as gate mixers, butterfly mixers, Banbury mixers, kneaders, intermixers, two-roller mills and the like. It is preferable in this mixing work, when the component (C) is used, that the components (A) and (C) alone are first mixed together and the mixture of these components is subjected to a heat treatment prior to admixture with the component (B). It is of course optional that the fluorosilicone rubber composition of the invention is admixed according to need with various kinds of known additives including non-reinforcing inorganic fillers, e.g. diatomaceous earth, finely pulverized quartz powder, powder of fused quartz glass, clay, aluminum oxide, calcium carbonate and talc, dispersion aids, e.g., low-molecular organopolysiloxane esters and silanol compounds, heat-resistance improvers. e.g., iron oxide and ceric oxide, electroconductivity-imparting agents, e.g., carbon black, and so on each in a limited amount.

When the thus prepared composition of the invention has a flowable consistency, it can be used as a potting agent, adhesives or sealing agent which is requires to exhibit excellent resistance against oils. When the composition has a consistency as a rubber compound and used for preparing rubber articles, the fluorosilicone rubber composition of the invention prepared int eh above described manner is then shaped into a desired form and subjected to curing into a cured silicone rubber article. THe method for shaping the composition is not particularly limitative and may be the same as for conventional silicone rubber compositions including compression molding, transfer molding and injection molding using a metal mold and calendering and extrusion molding for continuous-length forms depending on the particular form of the desired products. The thus shaped composition is subjected to curing by heating at 100° to 400° C. for a length of time of 30 seconds to 1 hour under normal pressure or under increased pressure and then to secondary curing according to need at 150° to 250° C. for 1 to 24 hours into a fully cured silicone rubber article having excellent mechanical strengths. The cured fluorosilicone rubber obtained in this manner has excellent resistance against oils and organic solvents, restorability from compression and mechanical strengths so that the fluorosilicone rubber composition fothe invention is useful as a material of diaphragms and oil seal as a part of transportation equipments.

In the following, the fluorosilicone rubber composition of the present invention is described in more detail by way of examples in which the term of "parts" always refers to "parts by weight".

PREPARATION 1

Preparation of the polymerixation catalyst

Into a flash of 200 ml capacity were introduced 10.2 g (0.1 mole) of vinyl dimethyl silanol and 100 ml of anhydrous tetrahydrofuran and then 1.0 g (0.14 mole) of metallic lithium in fine chips was added in three portions to the mixture in the flask under a stream of nitrogen. The mixture was agitated at room temperature for 10 hours to effect the reaction. Filtration of the reaction mixture to remove the unreacted metallic lithium gave a tetrahydrofuran solution of vinyl dimethyl siloxy lithium of the formula $ViMe_2SiOLi$.

In the next place, a solution of 44.4 g (0.2 mole) of hexamethyl cyclotrisiloxane dissolved in 35 ml of tetrahydrofuran was added dropwise to the above obtained tetrahydrofuran solution of vinyl dimethyl siloxy lithium and the reaction mixture was agitated for 24 hours at room temperature followed by distillation at 50° C. under a reduced pressure of 3 mmHg to remove tetrahydrofuran leaving 54 g of a clear oily material which could be identified by elementary analysis to be an organosiloxane oligomer expressed by the formula $ViMe_2Si-O-(-SiMe_2-O-)_6-Li$.

PREPARATION 2

Preparation of the fluorosilicone gum I

In a flask with a separable cover of 2 liter capacity were taken 1560 g (3.33 moles) of 1,3,5-trimethyl-1,3,5-tris(3,3,3-trifluoropropyl) cyclotrisiloxane which was heated at 150°C. under an atmosphere of nitrogen gas and then 1.38 g (0.0025 mole) of the organosiloxane oligomer obtained in Preparation 1 were added thereto under agitation. The mixture in the flask was further heated at 150° C. for 4 hours to effect the polymerization reaction and the thus obtained fluorine-substituted polydiorganosiloxane gum was transferred to a kneader and admixed there with 10 g (0.031 mole) of a 1.0:1.1 by moles mixture of vinyl dimetyl chlorosilane and vinyl dimethyl silazane as a neutralizing agent. The mixture was agitated first at room temperature for 1 hour and then at 150° C. for 1 hour to give a fluorine-substituted polydiorganosiloxane gum expressed by the formula

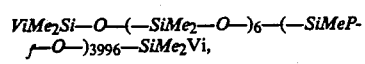

$ViMe_2Si-O-(-SiMe_2-O-)_6-(-SiMeP-f-O-)_{3996}-SiMe_2Vi$, in which $P_f$ is a 3,3,3-trifluoropropyl group. This product is referred to as the Silicone Gum I hereinbelow.

PREPARATION 3

Preparation of the fluorosilicone gum II

Polymerization of 1,3,5-trimethyl-1,3,5-tris(3,3,3-trifluoropropyl) cyclotrisiloxane in the presence of the organosiloxy lithium prepared in Preparation 1 was performed in the same manner as in Preparation 2 and the thus obtained lithium-terminated polydiorganosiloxane gum was subjected to a neutralization treatment by adding, in place of the mixture of vinyl dimethyl chlorosilane and vinyl dimethyl silazane, 1.2g (0.02 mole) of acetic acid in a kneader and the mixture was agitated first at room temperature for 1 hour and then at 150° C. for 1 hour to give a fluorine-substituted polydiorganosiloxane gum expressed by the formula

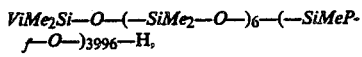
$ViMe_2Si—O—(—SiMe_2—O—)_6—(—SiMeP_f—O—)_{3996}—H,$ which is referred to as the Silicone Gum II hereinbelow.

PREPARATION 4

Preparation of the fluorosilicone gum III

An oily oligomeric organosiloxy lithium of the formula

$Me_3Si—O—(—SiMe_2—O—)_6—Li$ was prepared in the same manner as in Preparation 1 excepting replacement of the vinyl dimethyl silanol with 8.0 g (0.1 mole) of trimethyl silanol and the oragnosiloxy lithium compound was used in the polymerization of 1,3,5-trimethyl-1,3,5-tris(3,3,3-trifluoropropyl) cyclotrisiloxane in the same manner as in Preparation 2 to give a lithium-terminated fluorine substituted polydiorganosiloxane gum which was neutralized in the same manner as in Preparation 3 using acetic acid as the neutralizing agent to give a fluorine-substituted polydiorganosiloxane gum terminated at one molecular chain end with a trimethyl siloxy group and at the other end with a silanol group as expressed by the formula $Me_3Si—O—(—SiMe_2—O—)_6—(—SiMeP_f—O—)_{3996}—H,$ which is referred to as the Silicone Gum III hereinbelow.

PREPARATION 5-A

Preparation of the fluorosilicone gum IV-A

Copolymerization of 1560 g of 1,3,5-trimethyl-1,3,5-tris(3,3,3-trifluoropropyl) cyclotrisiloxane and 1.29 g of 1,3,5-trimethyl-1,3,5-trivinyl cyclotrisiloxane was performed by using the oily organosiloxy lithium prepared in Preparation 4 as the catalyst and the thus obtained lithium-terminated polydiorganosiloxane gum was neutralized in the same manner as in Preparation 3 with acetic acid as the neutralizing agent to give a fluorine-substituted polydiorganosiloxane gum, in which 0.15% by moles of the siliconbonded organic groups were vinyl groups, terminated at one of the molecular chain ends with a trimethyl silyl group and at the other molecular chain end with a silanol group as expressed by the formula

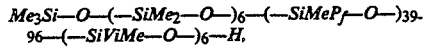
$Me_3Si—O—(—SiMe_2—O—)_6—(—SiMeP_f—O—)_{3996}—(—SiViMe—O—)_6—H,$ which is referred to as the Silicone Gum IV-A hereinbelow.

PREPARATION 5-B

Preparation of the fluorosilicone gum IV-B

The procedure for the preparation for a fluorine-substituted polydiorganosiloxane gum expressed by the structural formula

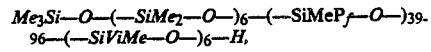
$Me_3Si—O—(—SiMe_2—O—)_6—(—SiMeP_f—O—)_{3996}—(—SiViMe—O—)_6—H,$ which is referred to as the Silicone Gum IV-B hereinbelow, was substantially the same as in the above described Preparation 5-A excepting replacement of the acetic acid used as the neutrailizing agent with a mixture of vinyl dimethyl chlorosilane and vinyl dimethyl silazane as used in Preparation 2.

PREPARATION 6

Preparation of the fluorosilicone gum V

A polymerization catalyst was prepared in the same manner as in Preparation 1 except that 44.4 g (0.2 mole) of hexamethyl cyclotrisiloxane were replaced with 93.6 g (0.2 mole) of 1,3,5-trimethyl-1,3,5-tris(3,3,3-trifluoropropyl) cyclotrisiloxane. This polymerization catalyst was used in the preparation of a fluorosilicone gum, which is referred to as the Silicone Gum V hereinbelow, in the same manner as in Preparation 2. Different from the Silicone Gum I prepared in Preparation 2, the Silicone Gum V had a molecular structure in which the vinyl dimethyl silyl group at the molecular chain terminal was bonded directly to a siloxane unit having a 3,3,3-trifluoropropyl group bonded to the silicon atom.

PREPARATION 7

Preparation of the fluorosilicone oils VI and VII

Into a flask of 5 liter capacity were introduced 3900 g of 1,3,5-trimethyl-1,3,5-tris(3,3,3-trifloropropyl) cyclotrisiloxane, 1.8 g of water, 1000 g of acetonitrile and 0.3 g of phenyl biscatechol benzyl trimethyl ammonium silicate (BTMAS) and the mixture was agitated for 8 hours at a temperature in the range from 0° C. to 25° C. Thereafter, 103 g of 1-vinyl-7-chloro-1,1,3,3,5,5,7,7-octamethyl tetrasiloxane and 85 g of 1,3-divinyl-1,1,3,3-tetramethyl disilazane were added to the mixture which was further agitated followed by filtration to remove the salt precipitated in the mixture. The filtrate was subjected to stripping of volatile matter at 100° C. under a pressure of 5 mmHg to give an oily product having a viscosity of 40,000 centipoise at 25° C. and expressed by the structural formula

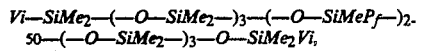
$Vi—SiMe_2—(—O—SiMe_2—)_3—(—O—SiMeP_f—)_2—(—O—SiMe_2—)_3—O—SiMe_2Vi,$ which is referred to as the Silicone Oil VI hereinbelow.

Separately, another run of the same procedure as above was undertaken except that the neutralization step was performed by using vinyl dimethyl chlorosilane instead of 1-vinyl-7-chloro-1,1,3,3,5,5,7,7-octamethyl tetrasiloxane also to give an oily product expressed by the structural formula $Vi-SiMe_2-(-O-SiMePf-)_{250}-(-O-SiMe_2Vi,$ which is referred to as the Silicone Oil VII hereinbelow.

PREPARATION 8

Preparation of the fluorosilicone oils VIII and IX

Into a flask of 5 liter capacity were introduced 450 g of an α,ω-dihydroxydimethyl polysiloxane of the formula $HO-SiMe_2-(-O-SiMe_2-)_{10}-O-SiMe_2OH,$ 2730 g of 1,3,5-trimethyl-1,3,5-tris(3,3,3-trifluoropropyl) cyclotrisiloxane, 600 g of acetonitrile and 0.3 g of phenyl biscatechol benzyl trimethyl ammonium silicate (BTMAS) and the polymerization reaction was performed in the same manner as in Preparation 7 above. The reaction mixture after completion of the polymerization reaction was neutralized by using 1-vinyl-7-chloro-1,1,3,3,-5,5,7,7-octamethyl tetrasiloxane and 1,3-divinyl-1,1,3,3-tetramethyl disilazane to give an oily product having a viscosity of 700 centipoise at 25° C. and expressed by the structural formula $Vi-SiMe_2-O-SiMe_2-O-SiMe_2-O-SiMe_2-O-$ $+(SiMePf-O)_{17.5}(SiMe_2-O)_{12}(SiMePf-O)_{17.5}+$ $-SiMe_2-O-SiMe_2-O-SiMe_2-O-SiMe_2Vi,$ which is referred to as the Silicone Oil VIII herebelow.

Separately, another run of the same procedure as above was undertaken except that the neutralization step was performed by using vinyl dimethyl chlorosilane instead of 1-vinyl-7-chloro-1,1,-3,3,5,5,7,7-octamethyl tetrasiloxane also to give an oily product having a viscosity of 700 centipoise at 25° C. and expressed by the structural formula $Vi-SiMe_2-O+(SiMePf-O)_{17.5}(SiMe_2-O)_{12}-$ $+SiMePf-O)_{17.5}+SiMe_2Vi,$ which is referred to as the Silicone OIl IX hereinbelow.

PREPARATION 9

Preparation of the fluorosilicone gum X

The procedure for the preparation of a fluorine-substituted polydiorganosiloxane gum was substantially the same as in Preparation 3 described above except that the 1,3,5-trimethyl-1,3,5-tris-(3,3,3-trifluoropropyl) cyclotrisiloxane was replaced with a combination of 2.58 g (0.01 mole) of 1,3,5-trimethyl-1,3,5-trivinyl cyclotrisiloxane and 1560 g (3.33 moles) of 1,3,5-trimethyl-1,3,5-tris-(3,3,3-trifluoropropyl) cyclotrisiloxane. The thus obtained fluorine-substituted polydiorganosiloxane, which is referred to as the Silicone Gum X hereinbelow, was expressed by the structural formula $ViMe_2Si-O-(-SiMe_2-O-)_6-[-(-SiMePf-O-)_n-(-SiViMe-O-)_m-]_{4000}-H,$ in which ma and n are each a positive integer with the proviso of m:(m+n)=0.003.

PREPARATION 10

Preparation of the fluorosilicone gum XIII

The procedure for the preparation of a fluorine-substituted polydiorganosiloxane gum was substantially the same as in Preparation 4 described above except that the 1,3,5trimethyl-1,3,5-tris-(3,3,3-trifluoropropyl) cyclotrisiloxane was replaced with a combination of 2.58 g (0.01 pl mole) of 1,3,5-trimethyl-1,3,5-trivinyl cyclotrisiloxane and 1560 g (3.33 moles) of 1,3,5-trimethyl-1,3,5-tris-(3,3,3-trifluoropropyl) cyclotrisiloxane. The thus obtained fluorine-substituted polydiorganosiloxane, which is referred to as the Silicone Gum XIII hereinbelow, was expressed by the structural formula $ViMe_2Si-O-(-SiMe_2-O-)_6-6[-(-SiMePf-O-)_n-(-SiViMe-O-)_m]_{4000}-H,$ in which m and n are each a positive integer with the proviso of m:(m+n)=0.003.

EXAMPLES 1 AND 2 AND COMPARATIVE EXAMPLES 1 TO 4.

Example 1

A fluorosilicone rubber compound was prepared in Example 1 by uniformly blending 100 parts of the Silicone Gum II prepared in Preparation 3 with 28 parts of a fumed silica filler having a specific surface area of 300 m²/g and 8.5 parts of an α,ω-dihydroxy poly(methyl 3,3,3-trifluoropropyl siloxane) having a viscosity of 80 centistokes at 25° C. on a two-roller mill followed by a heat treatment at 160° C. for 2 hours.

EXAMPLE 2

Similarly to Example 1 described above, another fluorosilicone rubber compound was prepared in Example 2 by uniformly blending, on a two-roller mill, 100 parts of the Silicone Gum I prepared in Preparation 2 with 20 parts of a fumed silica filler having a specific surface area of 130 m²/g and blocked on the surface with trimethyl silyl groups bonded thereto by a surface treatment.

Comparative Example 1

A silicone rubber compound was prepared in the same formulation as in Example 1 above excepting replacement of the Silicone Gum II with the same amount of the Silicone Gum IV-A prepared in Preparation 5-A.

Comparative Examples 2 to 4

Silicone rubber compounds were prepared in Comparative Examples 2, 3 and 4 each in the same formulation as in Example 2 above excepting replacement of The Silicone Gum I with the same amount of the Silicone Gum III, V and IV-B prepared in Preparations, 4, 6 and 5-B, respectively.

Figure 2:
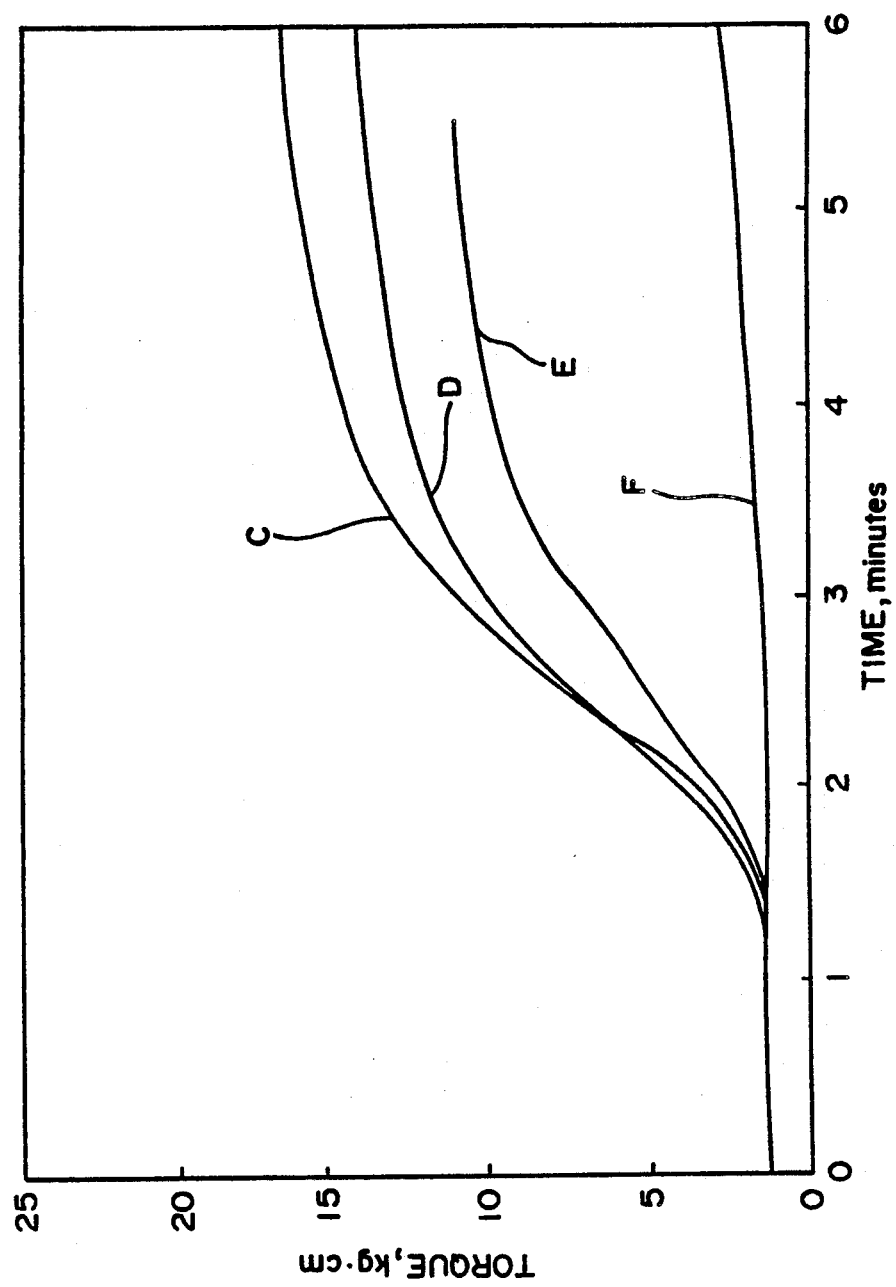

Each of the thus prepared fluorosilicone rubber compounds was further admixed with 0.8% by weight (Example 1 and Comparative Example 1) or 0.6% by weight (Example 2and Comparative Examples 2 to 4) by weight of 2,5-dimethyl-2,5-di(tert-butyl peroxy) hexane as a curing agent and shaped by sheeting into a sheet having a thickness of 2 mm, which was press-cured by heating at 165° C. for 10 minutes under a compressive force of 30 kg/cm² into a sheet of cured rubbery elastomer. The curing characteristics of these six rubber compositions are shown in FIGS. 1 and 2 as measured by using a disc rheometer at a temperature of 170° C. and ARC at 3° C, of which the curves A and B in FIG. 1 is for Example 1 and Comparative Example 1, respectively, and the curves C, F, D and E are for Example 2 and Comparative Examples 2, 3 and 4, respectively. Practically no curing could be obtained in the rubber composition prepared in Comparative Example 2 using the Silicone Gum III.

The cured silicone rubber sheets prepared in Examples 1 and 2 and Comparative Examples 1 to 3 were each subjected to the measurement of the physical properties including specific gravity ($d_{25}$), hardness, JIS A (H), ultimate elongation (E) in %, tensile strength (TS) in kg/cm$^2$ and tear strength ($T_{RA}$) in kg/cm. The results are shown in Table 1 below. Further, the silicone rubber sheets prepared in Example 1 and Comparative Example 1 were immersed in the JIS #3 oil at 150° C. for 170 hours or in Fuel B at room temperature for 24 hours and the decrements (−) or increments (+) in % of the hardness (ΔH), ultimate elongation (ΔE), tensile strength (ΔTS) and volume (ΔV) were determined. The results are also shown in Table 1.

EXAMPLE 3 AND COMPARATIVE EXAMPLE 5

In Example 3, 100 parts of the Silicone Oil VI prepared in Preparation 7 as uniformly blended with 25 parts of a finely divided wet-process silica filler having a specific surface area of 115 m$^2$/g and 2 parts of hexamethyl disilazane at a temperature of 130 to 150° C. in a kneader blender taking 6 hours. The blend was further admixed with 1 part of 1,3,5,7-tetravinyl-1,3,5,7-tetramethyl cyclotetrasiloxane, 4.0 parts of an organohydrogenpolysiloxane having a viscosity of 50 centistokes at 25° C. and expressed by the structural formula

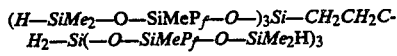

and chloroplatinic acid modified with 2-ethyl hexyl alcohol in an amount of 20 ppm by weight as platinum based on the Silicone Oil VI.

In Comparative Example 5, another composition was prepared in the same formulation as above excepting replacement of the Silicone Oil VI with the same amount of the Silicone Oil VII.

Each of these compositions having a specific gravity of 1.40 was subjected to the evaluations of the curing characteristics by the determination of the T$_{90}$ value, i.e. the length of time taken until the moment when the torque of mixing had reached 90% of the ultimate value, on an oscillating disc rheometer at 150° C. Further, each composition was shaped into a sheet of 2 mm thickness by compression molding at 170° C. taking 5 minutes followed by a post-curing at 200° C. For 4 hours. The results of measurements were as shown below.

Silicone Oil VI: T$_{90}$ of 45 seconds; hardness, JIS A, of 72; tensile strength of 200 kg/cm$^2$; and ultimate elongation of 80%.

Silicone Oil VII: T$_{90}$ of 60 seconds; hardness, JIS A, of 70; tensile strength of 160 kg/cm$^2$; and ultimate elongation of 65%.

TABLE 1

| Silicone Gum | II | I | IV-A | VI-B | V |
|---|---|---|---|---|---|
| $d_{25}$ | 1.41 | 1.38 | 1.41 | 1.38 | 1.38 |
| H | 38 | 26 | 38 | 24 | 23 |

TABLE 1-continued

| Silicone Gum | | II | I | IV-A | VI-B | V |
|---|---|---|---|---|---|---|
| As cured | E | 530 | 590 | 460 | 595 | 620 |
| | TS | 132 | 120 | 95 | 88 | 73 |
| | $T_{RA}$ | 21 | 20 | 14 | 12 | 10 |
| | ΔH | −4 | | −4 | | |
| After immersion in #3 oil | ΔE | −12 | | −10 | | |
| | ΔTS | −22 | | −18 | | |
| | ΔV | +3 | | +3 | | |
| | ΔH | −9 | | −10 | | |
| After immersion in Fuel B | ΔE | −38 | | −40 | | |
| | ΔTS | −52 | | −38 | | |
| | ΔV | +19 | | +20 | | |

EXAMPLE 4 AND COMPARATIVE EXAMPLE 6

In Example 4, 100 parts of the Silicone Oil VII prepared in Preparation 7 were admixed with 1.5 parts of a methyl hydrogen polysiloxane expressed by the structural formula

and a chloroplatinic acid-vinyl siloxane complex in an amount of 50 ppm by weight as platinum based on the Silicon Oil VI.

IN Comparative Example 6, another composition was prepared in the same formulation as above excepting replacement of the Silicone Oil VI with the same amount of the Silicone Oil VII.

Each of the compositions was subjected to the evaluation of the curing characteristics at 150° C. by the determination of the T$_{10}$ and T$_{90}$ values, i.e. the lengths of time taken until the moment when the torque of mixing had reached 10% and 90%, respectively, of the ultimate value, on an oscillating disc rheometer. The results were that T$_{10}$ and T$_{90}$ for the Silicone Oil VI were 105 seconds and 180 seconds, respectively, and T$_{10}$ and T$_{90}$ for the Silicone Oil VII were 125 seconds and 720 seconds, respectively.

EXAMPLE 5 AND COMPARATIVE EXAMPLE 7

A curable composition was prepared in Example 5 in the same formulation as in Example 1 excepting replacement of the Silicone Gum II with the same amount of a fluorine-containing diorganopolysiloxane oil, which is referred to as the Silicone Oil XI herebelow, having a viscosity of 25,000 centipoise at 25° C. and expressed by the structural formula

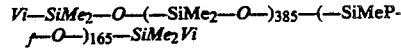

and also replacing 28 parts of the fumed silica filler with 40 parts of a finely divided wet-process silica filler having a specific surface area of 115 m$^2$/g as combined with 2.0 parts of hexamethyl disilazane.

In Comparative Example 7, another curable composition was prepared in the same formulation as in Example 5 above excepting replacement of the Silicone Oil XI with another fluorine-containing diorganopolysiloxane oil, which is referred to as the Silicone Oil XII hereinbelow, having a viscosity of 25,000 centipoise at 25° C. and expressed by the structural formula

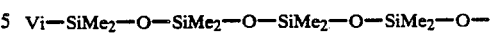
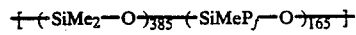

-continued

—SiMe$_2$—O—SiMe$_2$—O—SiMe$_2$—O—SiMe$_2$Vi.

Each of the compositions having a specific gravity of 1.28 was subjected to shaping and curing in the same manner as in Example 1 to give a cure silicone rubber sheet. The T$_{90}$ values of the compositions and the mechanical properties of the cured rubber sheets were as follows.

Silicone Oil XI: T$_{90}$ of 40 seconds; hardness, JIS A, of 47; tensile strength of 85 kg/cm$^2$; and ultimate elongation of 410%.

Silicone Oil XII: T$_{90}$ of 55 seconds; hardness, JIS A, of 45; tensile strength of 65 kg/cm$^2$; and ultimate elongation of 350%.

EXAMPLE 6

A fluorosilicone rubber compound was prepared by uniformly blending 100 parts of the Silicone Gum X prepared in Preparation 9 with 30 parts of a fumed silica filler having a specific surface area of 200 m$^2$/g and 6.5 parts of an α,ω-dihydroxy poly(methyl 3,3,3-trifluoropropyl siloxane) having a viscosity of 80 centistokes at 25° C. on a two-roller mill followed by a heat treatment at 160° C. for 2 hours.

The thus obtained silicone rubber composition was cured in the same manner as in Example 1 into a rubber sheet which has properties of: a specific gravity d$_{25}$ of 1.43; hardness, JIS A, of 44; ultimate elongation of 425%; tensile strength of 126 kg/cm$^2$; and tear strength of 27 kg/cm.

COMPARATIVE EXAMPLE 8

A silicone rubber compound was prepared in the same formulation as in Example 6 described above excepting replacement of the Silicone Gum X with the same amount of the Silicone Gum XIII prepared in Preparation 10.

The thus obtained silicone rubber composition was cured in the same manner as in Example 1 into a rubber sheet which has properties of: a specific gravity d$_{25}$ of 1.43; hardness, JIS A, of 44; ultimate elongation of 345%; tensile strength of 107 kg/cm$^2$; and tear strength of 18 kg/cm.

What is claimed is:

1. A curable fluorine-substituted organopolysiloxane composition which comprises, in mixture
    (A) a polyorganosiloxane having a viscosity of at least 400 centipoise at 25° C. and a molecular structure represented by the general formula $X^1$—O—(—SiR$_2$—O—)$_n$—(—SiRR$_f$—O—)$_m$—$X^2$, or

[$X^1$—O—(—SiR$_2$—O—)$_n$—(—SiRR$_f$—O—)$_m$—]$_p$-SiR$_{4-p}$, in which R is a monovalent hydrocarbon group selected from the class consisting of methyl, vinyl and phenyl groups, R$_f$ is a fluorinated alkyl group having 3 to 10 carbon atoms, n is zero or a positive integer, m is a positive integer with the proviso that n:(m+n) is in the range from 0.005 to 1, p is 2, 3 or 4, $X^1$ is a vinyl dimethyl siloxy-substituted silyl group represented by the general formula Vi-SiMe$_2$—(—O—SiMe$_2$—)$_r$—, in which Vi is a vinyl group, Me is a methyl group and r is a positive integer in the range from 1 to 30, and $X^2$ is a hydrogen atom or $X^1$; and
    (B) an organic peroxide curing agent in an amount sufficient to cure the component (A).

2. The curable fluorine-substituted organopolysiloxane composition as claimed in claim 1 which further comprises (C) a finely divided silica filler having a specific surface area of at least 50 m$^2$/g in an amount up to 100 parts by weight per 100 parts by weight of the component (A).

3. The curable fluorine-substituted organopolysiloxane composition as claimed in claim 1 wherein the amount of the organic peroxide as the curing agent is in the range from 0.1 to 10 parts by weight per 100 parts by weight of the component (A).

4. The curable fluorine-substituted organopolysiloxane composition as claimed in claim 1 wherein the group denoted by the symbol R$_f$ is a 3,3,3-trifluoropropyl group.

5. The curable fluorine-substituted organopolysiloxane composition as claimed in claim 1 wherein the group denoted by the symbol R$_f$ is a 2-(perfluorobutyl)ethyl group.

6. The curable fluorine-substituted organopolysiloxane composition as claimed in claim 1 wherein the group denoted by the symbol R$_f$ is a 2-(perfluorooctyl)ethyl group.

7. The curable fluorine-substituted organopolysiloxane composition as claimed in claim 1 wherein $X^2$ is $X^1$.

8. The curable fluorine-substituted organopolysiloxane composition as claimed in claim 1 wherein $X^2$ is a hydrogen atom.

* * * * *